(12) United States Patent
Kim et al.

(10) Patent No.: US 9,396,696 B2
(45) Date of Patent: Jul. 19, 2016

(54) LIQUID CRYSTAL DISPLAY DEVICE

(75) Inventors: Sung-Man Kim, Seoul (KR);
Hong-Woo Lee, Cheonan-si (KR);
Chang-Ho Lee, Seoul (KR); Eung-Gyu Lee, Cheonan-si (KR); Yu-Jun Kim, Incheon (KR); Yu-Jin Kim, Asan-si (KR); Jin-Suk Seo, Cheonan-si (KR); Byung-Su Oh, Daegu (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 900 days.

(21) Appl. No.: 12/861,360

(22) Filed: Aug. 23, 2010

(65) Prior Publication Data
US 2011/0187682 A1    Aug. 4, 2011

(30) Foreign Application Priority Data

Feb. 1, 2010    (KR) .................... 10-2010-0008951

(51) Int. Cl.
*G09G 5/00*    (2006.01)
*G09G 3/36*    (2006.01)
(52) U.S. Cl.
CPC ... *G09G 5/00* (2013.01); *G09G 3/36* (2013.01)
(58) Field of Classification Search
USPC .......................................................... 345/204
See application file for complete search history.

(56) References Cited

U.S. PATENT DOCUMENTS

| | | | |
|---|---|---|---|
| 2002/0175888 A1* | 11/2002 | Murade | G02F 1/13454 345/92 |
| 2005/0243044 A1* | 11/2005 | Kang | G02F 1/136286 345/87 |
| 2006/0164350 A1* | 7/2006 | Kim | G09G 3/3614 345/87 |
| 2007/0097072 A1* | 5/2007 | Kim | G09G 3/3614 345/103 |
| 2007/0164964 A1* | 7/2007 | Ha | G09G 3/3607 345/98 |
| 2008/0068551 A1* | 3/2008 | Lee | G02F 1/136213 349/144 |
| 2008/0180355 A1* | 7/2008 | Lee | G02F 1/136209 345/55 |

* cited by examiner

*Primary Examiner* — Kathy Wang-Hurst
*Assistant Examiner* — Douglas M Wilson
(74) *Attorney, Agent, or Firm* — F. Chau & Associates, LLC

(57) ABSTRACT

A liquid crystal display ("LCD") device includes a display panel, a data driving part, and at least one first light-blocking part and at least one second light-blocking part. The display panel includes a plurality of pixels and a plurality of data lines. The pixels are arranged in a column direction and a row direction. At least one of the data lines extends in a zigzag shape along the column direction to be discontinuously disposed between two adjacent columns of the pixels. The at least one data line is electrically connected to two of the pixels that are adjacent in the row direction. The second light-blocking part is thinner than the first light-blocking part. The first light-blocking part and the second light-blocking are repeatedly disposed on an area between two adjacent columns of the pixels. The data driving part applies a data signal to the data lines.

22 Claims, 13 Drawing Sheets

LIQUID CRYSTAL DISPLAY DEVICE

CROSS-REFERENCE TO RELATED APPLICATION

This application claims priority under 35 U.S.C. §119 to Korean Patent Application No. 2010-8951, filed on Feb. 1, 2010 in the Korean Intellectual Property Office (KIPO), the disclosure of which is incorporated by reference in its entirety herein.

BACKGROUND OF THE INVENTION

1. Technical Field

Exemplary embodiments of the present invention relate to a liquid crystal display ("LCD") device capable of enhancing display quality.

2. Discussion of Related Art

A liquid crystal display device includes an LCD panel and a driving device which drives the LCD panel. The LCD panel includes a plurality of data lines and a plurality of gate lines crossing the data lines. The LCD panel further includes pixels connected to the data lines and the gate lines. The driving device includes a gate driving circuit which outputs a gate signal to the gate lines, and a data driving circuit which outputs a data signal to the data lines.

An LCD device may include several data driving circuits, and thus efforts at reducing the number of data driving circuits may reduce cost and increase driving efficiency. For example, a panel structure having two adjacent pixels that share one data line may be used to reduce the number of data driving circuits.

One data line is included for every two pixels, such that the panel structure is divided into a first area and a second area. The data line is located between two pixels in the first area and the data line is excluded from the second area. Thus, a first width of a black matrix corresponding to the first area is wider than a second width of the black matrix corresponding to the second area. However, in the panel structure in which the data lines are shared, the difference between the first and second areas in accordance with the black matrix may cause a flickering of vertical lines.

SUMMARY OF THE INVENTION

According to an exemplary embodiment of the present invention, a liquid crystal display ("LCD") device includes a display panel, a data driving part, and at least one first light-blocking part and at least one second light-blocking part. The display panel includes a plurality of pixels and a plurality of data lines. The pixels are arranged in a column direction and a row direction. At least one of the data lines extends in a zigzag shape along the column direction to be discontinuously disposed between two adjacent columns of the pixels. The at least one data line is electrically connected to two of the pixels that are adjacent in the row direction. The second light-blocking part is thinner than the first light-blocking part. The first and second light-blocking parts are disposed on an area between two adjacent columns of the pixels and are periodically repeated along the column direction. The data driving part applies a data signal to the data lines. The first and second light-blocking parts may be repeatedly disposed between the adjacent columns. The first light-blocking part may be disposed on an area on which one of the data lines is continued, and the second light-blocking part may be disposed on an area on which the one data line is discontinued.

In at least one exemplary embodiment of the present invention, at least one of the data lines may include a first wiring disposed between a first pixel and a second pixel of a first pixel row, and a second wiring bent in a row direction with respect to the first wiring to be disposed between a third pixel and a fourth pixel of a second pixel row adjacent the first pixel row.

In at least one exemplary embodiment of the present invention, at least one of the data lines may include a first wiring disposed between a first pixel and a second pixel in a first pixel row, a second wiring bent in a first row direction with respect to the first wiring to be disposed between a third pixel and a fourth pixel in a second pixel row adjacent the first pixel row, a third wiring bent in the first row direction with respect to the second wiring to be disposed between a fifth pixel and a sixth pixel in a third pixel row adjacent the second pixel row, and a fourth wiring bent in a second row direction substantially opposite to the first row direction with respect to the third wiring to be disposed between a seventh pixel and an eighth pixel in a fourth pixel row adjacent the third pixel row.

In at least one exemplary embodiment of the invention, at least one of the data lines may include a first wiring disposed between the first pixel and the second pixel in a first pixel row, a second wiring extended in a column direction with respect to the first wiring to be disposed between a third pixel and a fourth pixel in a second pixel row adjacent the first pixel row, a third wiring extended in the column direction with respect to the second wiring to be disposed between a fifth pixel and a sixth pixel in a third pixel row adjacent the second pixel row, and a fourth wiring bent in the row direction with respect to the third wiring to be disposed between a seventh pixel and an eighth pixel in a fourth pixel row adjacent the third pixel row.

In at least one exemplary embodiment of the invention, at least one of the data lines may include a first wiring disposed between the first pixel and the second pixel in a first pixel row, a second wiring extended in a column direction with respect to the first wiring to be disposed between a third pixel and a fourth pixel in a second pixel row adjacent the first pixel row, a third wiring extended in the column direction with respect to the second wiring to be disposed between a fifth pixel and a sixth pixel in a third pixel row adjacent the second pixel row, a fourth wiring bent in a first row direction with respect to the third wiring to be disposed between a seventh pixel and an eighth pixel in a fourth pixel row adjacent the third pixel row, a fifth wiring bent in a second row direction substantially opposite to the first row direction with respect to the fourth wiring to be disposed between a ninth pixel and a tenth pixel in a fifth pixel row adjacent the fourth pixel row, a sixth wiring extended in the column direction with respect to the fifth wiring to be disposed between an eleventh pixel and a twelfth pixel in a sixth pixel row adjacent the fifth pixel row, a seventh wiring bent in the second row direction with respect to the sixth wiring to be disposed between a thirteenth pixel and a fourteenth pixel in a seventh pixel row adjacent the sixth pixel row.

BRIEF DESCRIPTION OF THE DRAWINGS

The present invention will become more apparent by describing in detailed exemplary embodiments thereof with reference to the accompanying drawings, in which.

DETAILED DESCRIPTION OF EXEMPLARY EMBODIMENTS

Figure 1:
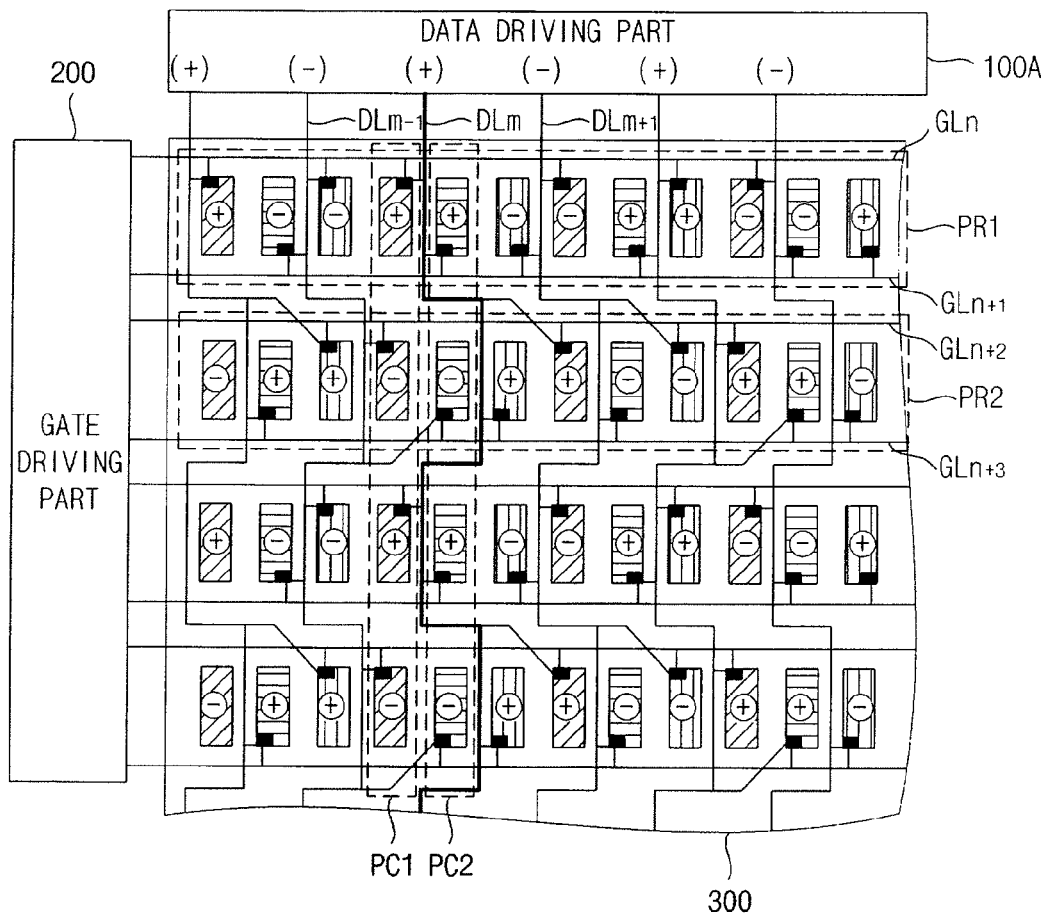
FIG. 1 is a plan view illustrating a liquid crystal display device according to an exemplary embodiment of the present invention.
Figure 1:
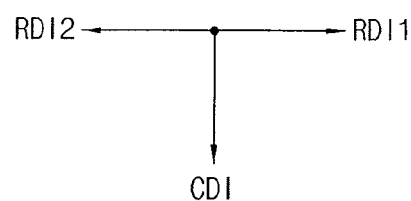
Figure 1:
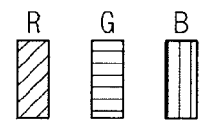

The present invention is described more fully hereinafter with reference to the accompanying drawings, in which exemplary embodiments thereof are shown. The present invention may, however, be embodied in many different forms and should not be construed as limited to the exemplary embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. Like numerals refer to like elements throughout. Hereinafter, exemplary embodiments of the present invention will be explained in further detail with reference to the accompanying drawings.

Figure 2:
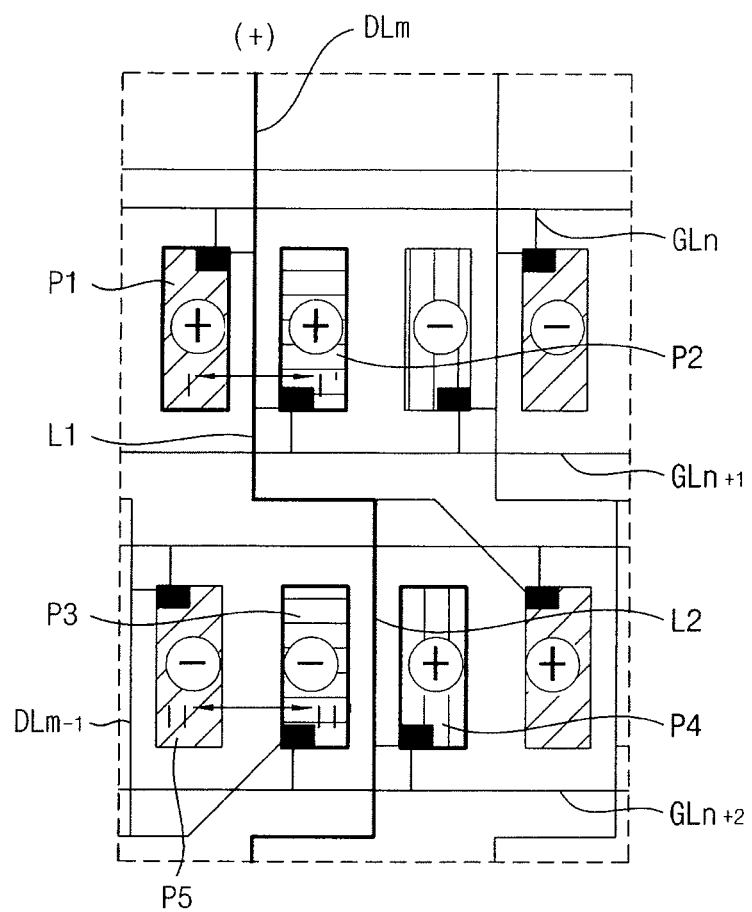
FIG. 2 is an enlarged view showing a pixel structure of the display panel of FIG. 1.
Figure 2:
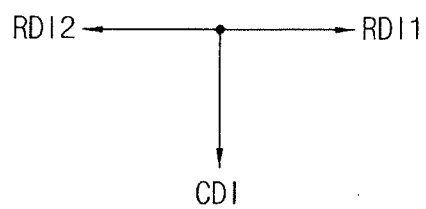

FIG. 1 is a plan view illustrating a liquid crystal display device according to an exemplary embodiment of the present invention. FIG. 2 is an enlarged view showing a pixel structure of the display panel of FIG. 1.

Referring to FIGS. 1 and 2, the LCD device includes a data driving part 100A, a gate driving part 200 and a display panel 300.

The data driving part 100A applies data signals of alternating polarities to a plurality of data lines DLm−1, DLm and DLm+1 formed on the display panel 300 during one frame. For example, during an N-th frame, a data signal of a negative polarity (−) is applied to an (m−1)-th data line DLm−1, a data signal of a positive polarity (+) is applied to an m-th data line DLm, and a data signal of a negative polarity (−) is applied to (m+1)-th data line DLm+1. Then, during an (N+1)-th frame, a data signal of a positive polarity (+) is applied to an (m−1)-th data line DLm−1, a data signal of a negative polarity (−) is applied to an m-th data line DLm, and a data signal of a positive polarity (+) is applied to (m+1)-th data line DLm+1. Accordingly, the data driving part 100A may drive the display panel 300 in a column inversion driving method, where 'm' and 'N' are positive integers. The m-th data line DLm may be refer to the odd numbered data lines and the (m−1)-th data line DLm−1 and the (m+1)-th data line DLm+1 may refer to the even numbered data lines or vice versa.

The gate driving part 200 sequentially applies gate signals to a plurality of gate lines GLn, GLn+1, GLn+2 and GLn+3 formed on the display panel 300, where 'n' is a positive integer. An odd-numbered gate line and an even-numbered gate line apply gate signals to pixels included in one pixel row. The one pixel row may include a red pixel R, a green pixel G and a blue pixel B. For example, the red pixel R is electrically connected to an odd-numbered gate line, the green pixel G is electrically connected to an even-numbered gate line, and the blue pixel B is electrically connected to the odd-numbered gate line and the even-numbered gate line.

The display panel 300 includes a plurality of pixels, the data lines DLm−1, DLm and DLm+1, and the gate lines GLn, GLn+1, GLn+2 and GLn+3. The pixels are arranged in a plurality of pixel rows (e.g., PR1 and PR2) and in a plurality of pixel columns (e.g., PC1 and PC2) and may be driven in a 1×2 dot inversion method.

Each of the data lines DLm−1, DLm and DLm+1 is extended in a zigzag shape or a pulse shape along the column direction CDI to be discontinuously disposed between two pixel columns adjacent each other, and is electrically connected to two pixels adjacent along the row direction.

For example, a data line alternates between being disposed between a first pixel column and a second adjacent pixel column, and between the second pixel column and an adjacent third pixel column. The part of the data line disposed between the first and second pixel columns is connected to a corresponding pixel of the first and second pixel columns in the same row. The part of the data line disposed between the second and third pixel columns is connected to a corresponding pixel of the third pixel column and a pixel of an adjacent fourth pixel column in the same row.

For example, an m-th data line DLm extends in the column direction, and a zigzag pattern bent in a zigzag shape is repeatedly formed in a period of two pixel rows. The zigzag shape may be shaped as a series of pulses. Thus, the m-th data line DLm is discontinuously disposed between a first pixel column PC1 and a second pixel column PC2 adjacent each other. The m-th data line DLm is disposed between the first and second pixel columns PC1 and PC2 in correspondence with a first pixel row PR1. However, the m-th data line DLm is not disposed between the first and second pixel columns PC1 and PC2 in correspondence with a second pixel row PR2.

The m-th data line DLm includes a first wiring L1 and a second wiring L2. The first wiring L1 is disposed between a first pixel P1 and a second pixel P2 in a first pixel row PR1, and the second wiring L2 is bent in a first row direction RDI1 with respect to the first wiring L1 to be disposed between a third pixel P3 and a fourth pixel P4 in a second pixel row PR2 adjacent the first pixel row PR1.

The n-th gate line GLn is disposed above the first pixel row PR1, the (n+1)-th gate line GLn+1 is disposed below the first pixel row PR1, and the n-th gate line GLn and the (n+1)-th gate line GLn+1 are electrically connected to pixels of the first pixel row PR1, respectively.

For example, the first pixel P1 is electrically connected to the m-th data line DLm and the n-th gate line GLn, the second pixel P2 is electrically connected to the m-th data line DLm and the (n+1)-th gate line GLn+1, the third pixel P3 is electrically connected to the (m−1)-th data line DLm−1 and the (n+2)-th gate line GLn+2, and the fourth pixel P4 is electrically connected to the m-th data line DLm and the (n+3)-th gate line GLn+3. The third pixel P3 included in the second pixel column PC2 may be identical to the second pixel P2.

Figure 3A:
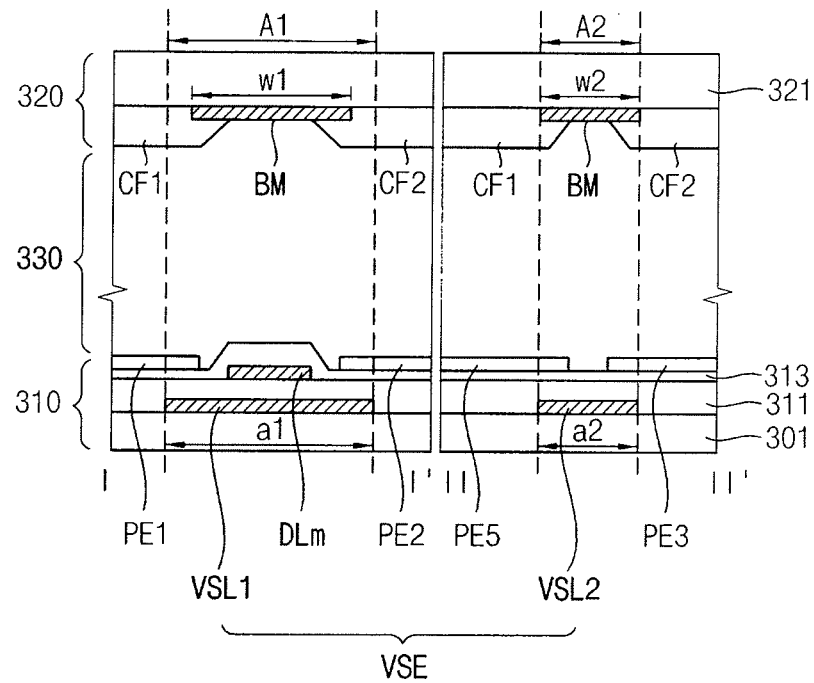
FIGS. 3A and 3B are cross-sectional views taken along a line I-I' and a line II-IF of FIG. 2.
Figure 3B:
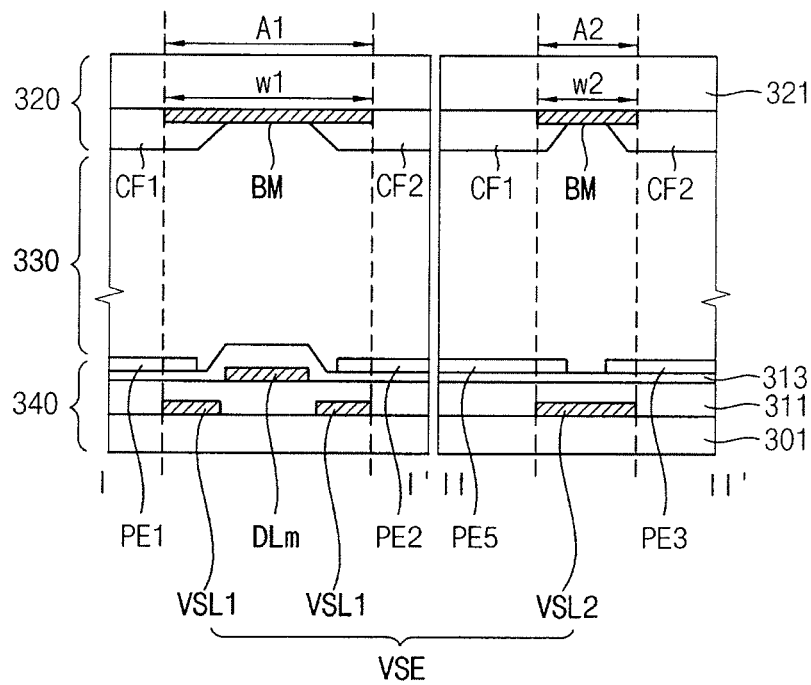

FIGS. 3A and 3B are cross-sectional views taken along a line I-I' and a line II-II' of FIG. 2. FIG. 3A shows that a storage common electrode includes a first light-blocking part A1 and a second light-blocking part A2 between the first pixel column PC1 and the second pixel column PC2. Referring to FIGS. 2 and 3A, the display panel 300 includes a first substrate 310 including a plurality of thin-film transistors arrayed thereon, a second substrate 320 including a color filter and a black matrix formed thereon, and a liquid crystal layer 330 interposed between the first and second substrates 310 and 320.

The first substrate 310 includes a base substrate 301, a storage common electrode VSE, a gate insulation layer 311, an m-th data line DLm, a protection insulation layer 313 and pixel electrodes PE1, PE2, PE3 and PE5. First, second and third pixel electrodes PE1, PE2 and PE3 are included in the first, second and third pixels P1, P2 and P3, respectively. The fifth pixel electrode PE5 is included in a fifth pixel P5 adjacent the third pixel P3 in a second row direction.

The storage common electrode VSE includes a first storage line VSL1 disposed between the first and second pixel columns PC1 and PC2 in correspondence with the first pixel row PR1, and a second storage line VSL2 disposed between the first and second pixel columns PC1 and PC2 in correspondence with the second pixel row PR2. The first storage line VSL1 has a first width 'a1', and the second storage line VSL2 has a second width 'a2' thinner than the first width 'a1.'

The second substrate 320 includes a base substrate 321 and a plurality of color filters CF1 and CF2 facing the pixel electrodes PE1, PE2, PE3 and PE5 and a black matrix BM. The black matrix BM is disposed between the first and second pixel columns PC1 and PC2. The black matrix BM is formed on an area on which the m-th data line DLm is disposed to have a first width W1, and is formed on an area excluding the m-th data line DLm to have a second width W2 that is narrower than the first width Q1. The first width W1 may be narrower than or equal to a width of the first storage line VSL1, and the second width W2 may be narrower than or equal to a width of the second storage line VSL2.

The first storage line VSL1 may define the extent of the first light-blocking part A1 in correspondence with an area on which the m-th data line DLm is disposed, and the second storage line VSL2 may define the extent of the second light-blocking part A2 in correspondence with an area on which the m-th data line DLm is excluded. The first light-blocking part A1 is disposed on an area on which the m-th data line DLm is formed, and the second light-blocking part A2 is disposed on an area on which the m-th data line DLm is excluded.

As the m-th data line DLm is discontinuously disposed between the first and second pixel columns PC1 and PC2, the first and second light-blocking parts A1 and A2 having widths different from each other are repeatedly formed between the first and second pixel columns PC1 and PC2 in a period. Thus, vertical line defects viewed between the first and second pixel columns PC1 and PC2 may be prevented.

FIG. 3B shows that the black matrix BM corresponds to a first light-blocking part A1 and a second light-blocking part A2 between the first pixel column PC1 and the second pixel column PC2. Referring to FIGS. 2 and 3B, the storage common electrode VSE includes a plurality of first storage lines VSL1 disposed between the first and second pixel columns PC1 and PC2 in correspondence with the first pixel row PR1, and a second storage line VSL2 disposed between the first and second pixel columns PC1 and PC2 in correspondence with the second pixel row PR2. The plurality of first storage lines VSL1 are disposed at two end portions of the m-th data line DLm.

The black matrix BM is disposed between the first and second pixel columns PC1 and PC2. The black matrix BM is formed on an area on which the m-th data line DLm is disposed to have a first width W1, and is formed on an area on which the m-th data line DLm is excluded to have a second width W2 that is narrower than the first width W1.

The black matrix BM may define the extent of the first light-blocking part A1 in correspondence with an area on which the m-th data line DLm is disposed, and may define the extent of the second light-blocking part A2 in correspondence with an area on which the m-th data line DLm is excluded.

The m-th data line DLm is bent in a zigzag shape or pulse shape to be discontinuously disposed between a first pixel column PC1 and a second pixel column PC2 adjacent each other. Accordingly, the first and second light-blocking parts A1 and A2 having widths different from each other are repeatedly formed between the first and second pixel columns PC1 and PC2 in a period, so that the first and second light-blocking parts A1 and A2 may prevent vertical line defects.

While it has been described that a color filter (e.g., CF1 or CF2) and a black matrix BM are formed on a second substrate 320, embodiments of the invention are not limited thereto. For example, in an alternate embodiment, at least one of the color filter (e.g., CF1 or CF2) and the black matrix BM may be formed on the first substrate 310.

Figure 4:
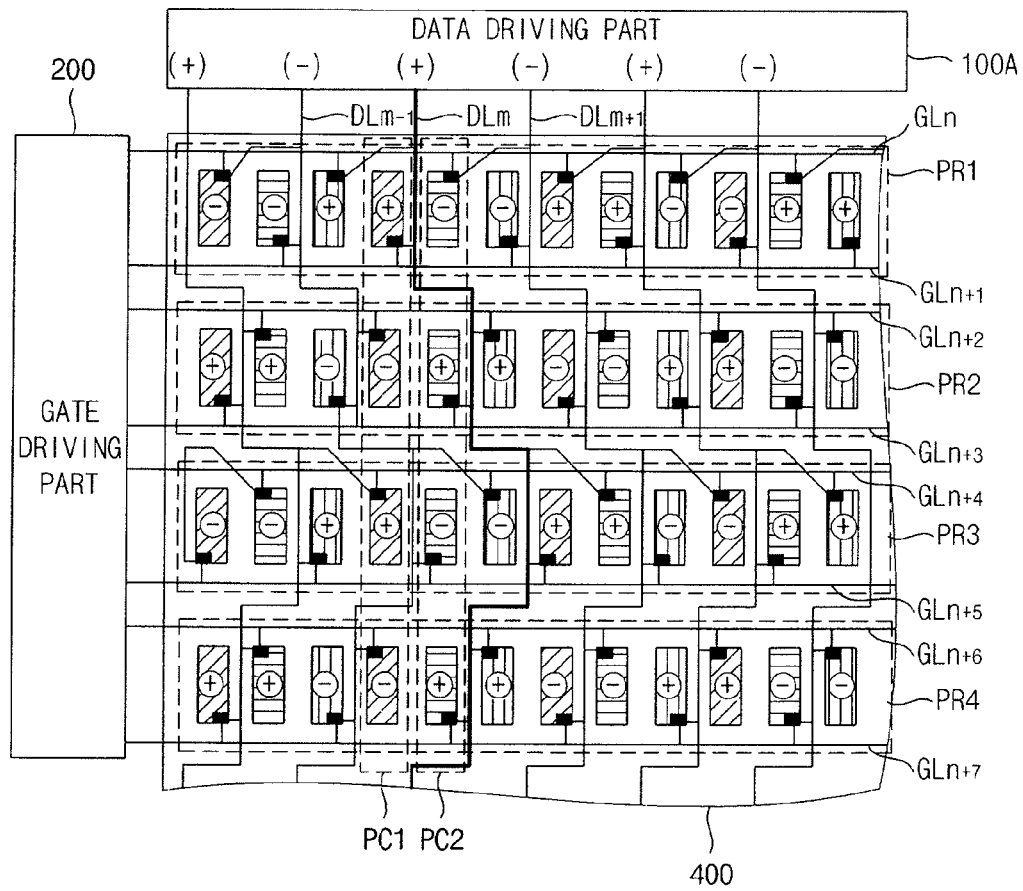
FIG. 4 is a plan view illustrating an LCD device according to an exemplary embodiment of the present invention.
Figure 4:
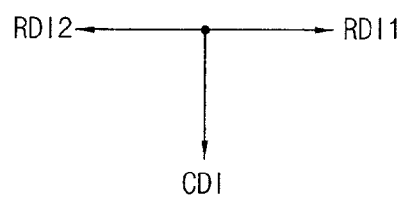
Figure 4:
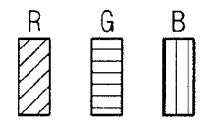
Figure 5:
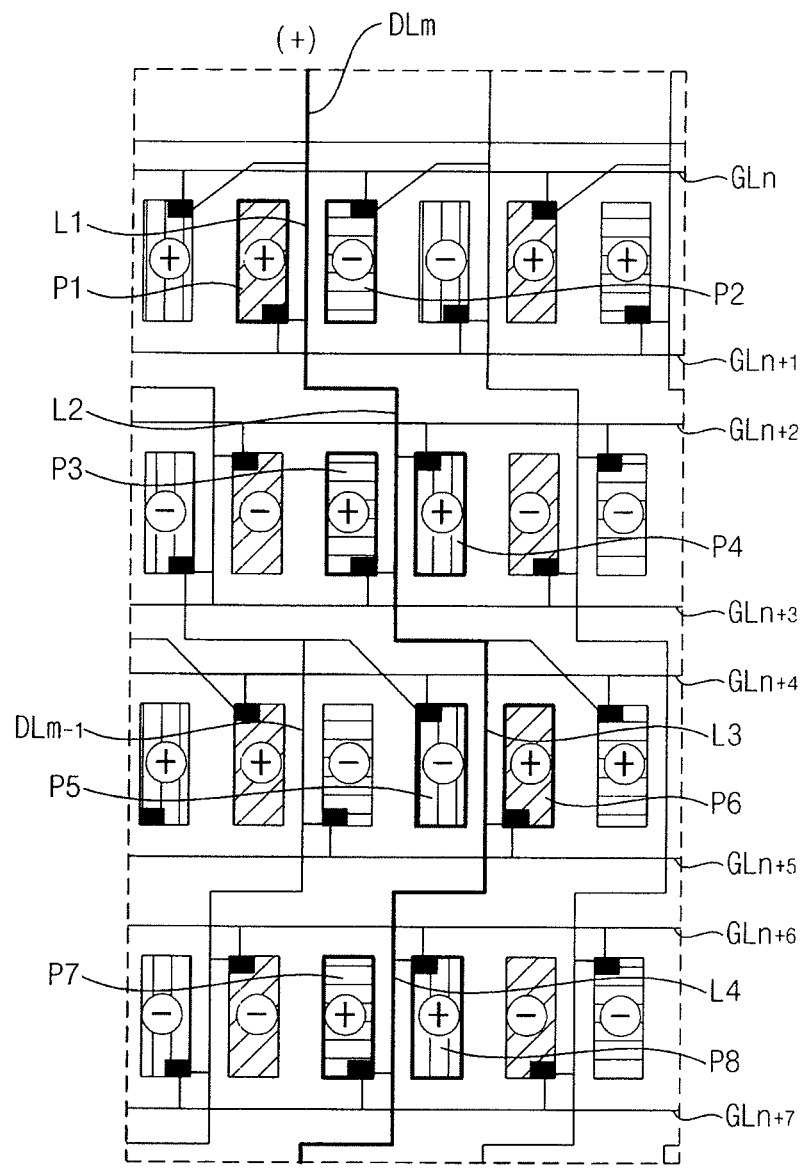
FIG. 5 is an enlarged view showing a pixel structure of the display panel as shown in FIG. 4.
Figure 5:
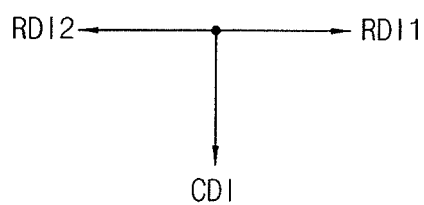

FIG. 4 is a plan view illustrating an LCD device according to an exemplary embodiment of the present invention. FIG. 5 is an enlarged view showing a pixel structure of the display panel as shown in FIG. 4. Referring to FIGS. 4 and 5, the LCD device includes a data driving part 100A, a gate driving part 200 and a display panel 400.

The data driving part 100A respectively applies data signals having alternating polarities to a plurality of data lines DLm−1, DLm and DLm+1 formed on the display panel 400 for one frame. The data driving part 100A may drive the display panel 300 in a column inversion driving method.

The gate driving part 200 sequentially applies gate signals to a plurality of gate lines GLn, GLn+1, . . . , GLn+7 formed on the display panel 400, where 'n' is a positive integer. An odd-numbered gate line and an even-numbered gate line apply gate signals to pixels included in one pixel row. The one pixel row includes a red pixel R, a green pixel G, and a blue pixel B. For example, the red pixel R is electrically connected to an odd-numbered gate line, the green pixel G is electrically connected to an even-numbered gate line, and the blue pixel B is electrically connected to the odd-numbered and even-numbered gate lines.

The display panel 400 includes a plurality of pixels, the data lines DLm−1, DLm and DLm+1, and the gate lines GLn, GLn+1, . . . , GLn+7. The pixels are arranged in a plurality pixel rows (e.g., PR1, PR2, PR3 and PR4) and a plurality of pixel columns (e.g., PC1 and PC2), and may be driven in a 1×2 dot inversion method.

For example, an m-th data line DLm extends in the column direction, and a zigzag pattern bent in a zigzag shape is repeatedly formed in a period of four pixel rows. The zigzag shape may include two increasing steps followed by a decreasing step. Thus, the m-th data line DLm is discontinuously disposed between the first pixel column PC1 and a second pixel column PC2 adjacent each other. The m-th data line DLm is disposed between the first and second pixel columns PC1 and PC2 in correspondence with the first pixel row PR1. However, the m-th data line DLm is not disposed between the first and second pixel columns PC1 and PC2 in correspondence with the second pixel row PR2, a third pixel row PR3, and a fourth pixel row PR4. An (m−1)-th data line DLm−1 is disposed between the first and second pixel columns PC1 and PC2 in correspondence with the third pixel row PR3.

For example, a first part of a data line may be disposed between a first pixel column and an adjacent second pixel column, a second part of the data line may be disposed between the second pixel column and an adjacent third pixel column, a third part of the data line may be disposed between the third pixel column and an adjacent fourth pixel column, and a fourth part of the data line may be disposed between the third pixel column and the second pixel column.

The m-th data line DLm includes a first wiring L1, a second wiring L2, a third wiring L3 and a fourth wiring L4. The first wiring L1 is disposed between a first pixel P1 and a second pixel P2 of the first pixel row PR1. The second wiring L2 is bent in a first row direction RDI1 with respect to the first wiring L1 to be disposed between a third pixel P3 and a fourth pixel P4 of a second pixel row PR2 adjacent the first pixel row PR1. The third wiring L3 is bent in the first row direction RDI1 with respect to the second wiring L2, and the fourth wiring L4 is bent in a second row direction RDI2 opposite to the first row direction RDI1 with respect to the third wiring L3 to be disposed between a seventh pixel P7 and an eighth pixel P8 of a fourth pixel row PR4 adjacent the third pixel row PR3.

The n-th gate line GLn is disposed above the first pixel row PR1, the (n+1)-th gate line GLn+1 is disposed below the first pixel row PR1, and the n-th gate line GLn and the (n+1)-th gate line GLn+1 are electrically connected to pixels of the first pixel row PR1, respectively. The (n+2)-th gate line GLn+2 is disposed above the second pixel row PR2, the (n+3)-th gate line GLn+3 is disposed below the first pixel row PR1, and the (n+2)-th gate line GLn+2 and the (n+3)-th gate line GLn+3 are electrically connected to pixels of the second pixel row PR2, respectively.

The (n+4)-th gate line GLn+4 is disposed above the third pixel row PR3, the (n+5)-th gate line GLn+5 is disposed below the third pixel row PR3, and the (n+4)-th gate line GLn+4 and the (n+5)-th gate line GLn+5 are electrically connected to pixels of the third pixel row PR3, respectively. The (n+6)-th gate line GLn+6 is disposed above the fourth pixel row PR4, the (n+7)-th gate line GLn+7 is disposed below the fourth pixel row PR4, and the (n+6)-th gate line GLn+6 and the (n+7)-th gate line GLn+7 are electrically connected to pixels of the fourth pixel row PR4, respectively.

The first pixel P1 is electrically connected to the m-th data line DLm and the (n+1)-th gate line GLn+1, and the second pixel P2 is electrically connected to the (m+1)-th data line DLm+1 and the n-th gate line GLn. The third pixel P3 is electrically connected to the m-th data line DLm and the (n+3)-th gate line GLn+3, and the fourth pixel P4 is electrically connected to the m-th data line DLm and the (n+2)-th gate line GLn+2.

The fifth pixel P5 is electrically connected to the (m−1)-th data line DLm−1 and the (n+4)-th gate line GLn+4, and the sixth pixel P6 is electrically connected to the m-th data line DLm and the (n+5)-th gate line GLn+5. The seventh pixel P7 is electrically connected to the m-th data line DLm and the (n+7)-th gate line GLn+7, and the eighth pixel P8 is electrically connected to the m-th data line DLm and the (n+6)-th gate line GLn+6.

The m-th data line DLm is bent in a zigzag shape or step shape to be discontinuously disposed between a first pixel column PC1 and a second pixel column PC2 adjacent each other. Accordingly, as described in FIGS. 3A and 3B, the first and second light-blocking parts A1 and A2 having widths different from each other are repeatedly formed between the first and second pixel columns PC1 and PC2 in a period, so that the first and second light-blocking parts A1 and A2 may prevent vertical line defects.

Figure 6:
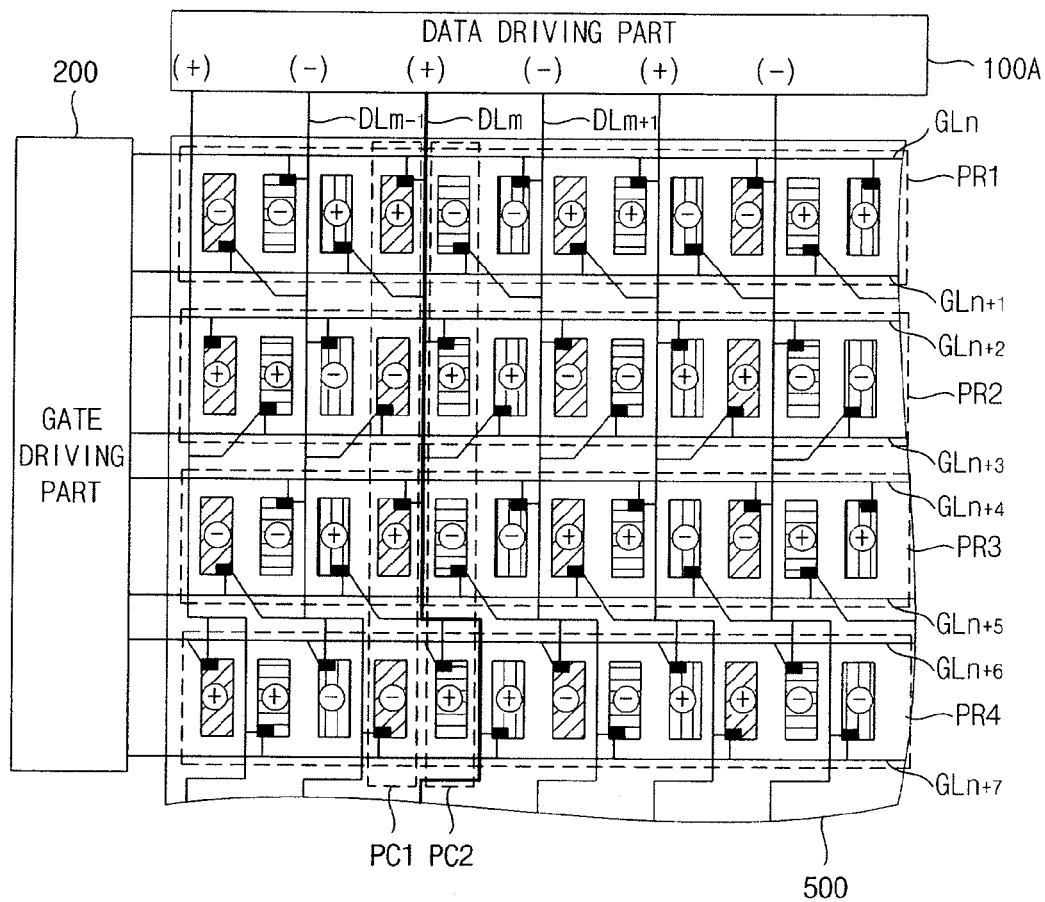
FIG. 6 is a plan view illustrating an LCD device according to an exemplary embodiment of the present invention.
Figure 6:
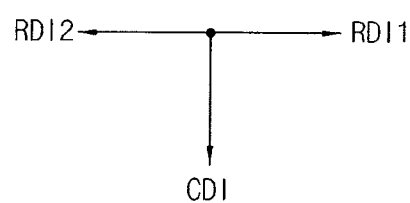
Figure 6:
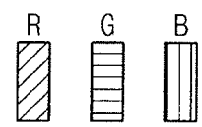
Figure 7:
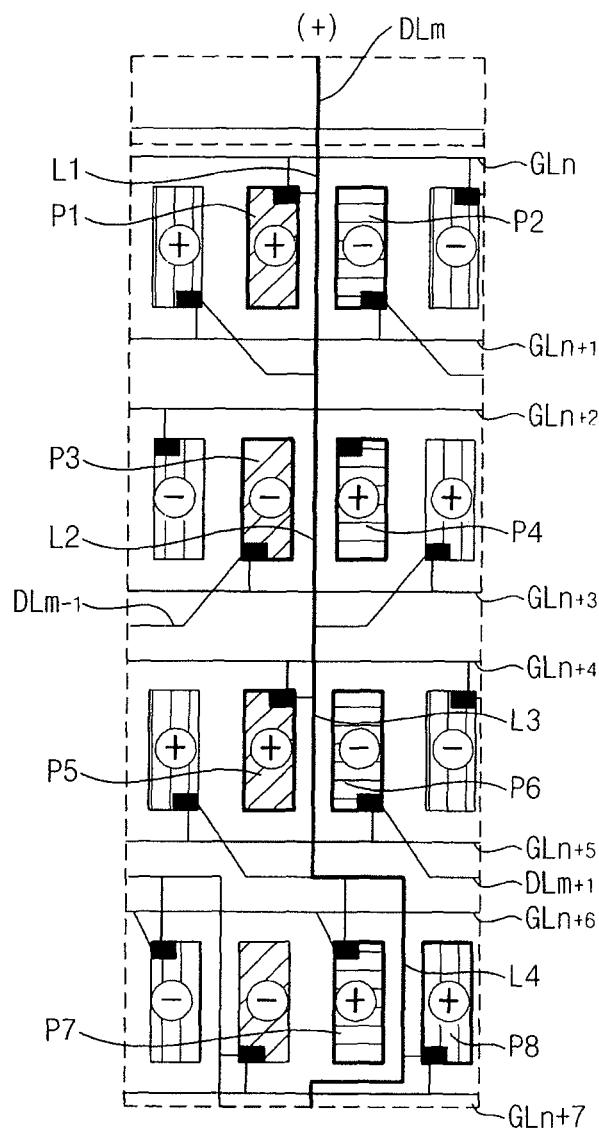
FIG. 7 is an enlarged view showing a pixel structure of the display panel as shown in FIG. 6.
Figure 7:
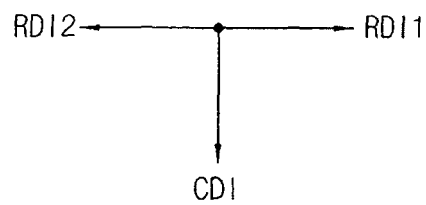

FIG. 6 is a plan view illustrating an LCD device according to still an exemplary embodiment of the present invention. FIG. 7 is an enlarged view showing a pixel structure of the display panel as shown in FIG. 6. Referring to FIGS. 6 and 7, the LCD device includes a data driving part 100A, a gate driving part 200 and a display panel 500.

The data driving part 100A respectively applies data signals having alternating polarities to a plurality of data lines DLm−1, DLm and DLm+1 formed on the display panel 500 for one frame. The data driving part 100A may drive the display panel 500 in a column inversion driving method.

The gate driving part 200 sequentially applies gate signals to a plurality of gate lines GLn, GLn+1, . . . , GLn+7 formed on the display panel 500, where 'n' is a positive integer. An odd-numbered gate line and an even-numbered gate line apply gate signals to pixels included in one pixel row. The one pixel row includes a red pixel R, a green pixel G, and a blue pixel B. For example, the red pixel R is electrically connected to an odd-numbered gate line, the green pixel G is electrically connected to an even-numbered gate line, and the blue pixel B is electrically connected to the odd-numbered and even-numbered gate lines.

The display panel 500 includes a plurality of pixels, the data lines DLm−1, DLm and DLm+1, and the gate lines GLn, GLn+1, . . . , GLn+7. The pixels are arranged in a plurality pixel rows PR1, PR2, PR3 and PR4 and a plurality of pixel columns PC1 and PC2, and may be driven in a 1×2 dot inversion method.

For example, an m-th data line DLm is extended in the column direction, and a zigzag pattern bent in a zigzag shape is repeatedly formed in a period of four pixel rows. The zigzag shape may include a single pulse shape. Thus, the m-th data line DLm is discontinuously disposed between the first pixel column PC1 and a second pixel column PC2 adjacent each other. The m-th data line DLm is disposed between the first and second pixel columns PC1 and PC2 in correspondence with a first pixel row PR1, a second pixel row PR2 and a third pixel row PR3. However, the m-th data line DLm is not disposed between the first and second pixel columns PC1 and PC2 in correspondence with a fourth pixel row PR4.

The m-th data line DLm includes a first wiring L1, a second wiring L2, a third wiring L3 and a fourth wiring L4. The first wiring L1 is disposed between a first pixel P1 and a second pixel P2 of the first pixel row PR1, and the second wiring L2 is extended in the column direction CDI with respect to the first wiring L1 to be disposed between a third pixel P3 and a fourth pixel P4 of a second pixel row PR2 adjacent the first pixel row PR1. The third wiring L3 is extended in the column direction CDI with respect to the second wiring L2 to be disposed between a fifth pixel P5 and a sixth pixel P6 of a third pixel row PR3 adjacent the second pixel row PR3, and the fourth wiring L4 is bent in a first row direction RDI1 with respect to the third wiring L3 to be disposed between a seventh pixel P7 and an eighth pixel P8 of a fourth pixel row PR4 adjacent the third pixel row PR3.

The n-th gate line GLn is disposed above the first pixel row PR1, the (n+1)-th gate line GLn+1 is disposed below the first pixel row PR1, and the n-th gate line GLn and the (n+1)-th gate line GLn+1 are electrically connected to pixels of the first pixel row PR1, respectively. The (n+2)-th gate line GLn+2 is disposed above the second pixel row PR2, the (n+3)-th gate line GLn+3 is disposed below the first pixel row PR1, and the (n+2)-th gate line GLn+2 and the (n+3)-th gate line GLn+3 are electrically connected to pixels of the second pixel row PR2, respectively.

The (n+4)-th gate line GLn+4 is disposed above the third pixel row PR3, the (n+5)-th gate line GLn+5 is disposed below the third pixel row PR3, and the (n+4)-th gate line GLn+4 and the (n+5)-th gate line GLn+5 are electrically connected to pixels of the third pixel row PR3, respectively. The (n+6)-th gate line GLn+6 is disposed above the fourth pixel row PR4, the (n+7)-th gate line GLn+7 is disposed below the fourth pixel row PR4, and the (n+6)-th gate line GLn+6 and the (n+7)-th gate line GLn+7 are electrically connected to pixels of the fourth pixel row PR4, respectively.

The first pixel P1 is electrically connected to the m-th data line DLm and the n-th gate line GLn, and the second pixel P2 is electrically connected to the (m+1)-th data line DLm+1 and the (n+1)-th gate line GLn+1. The third pixel P3 is electrically connected to the (m−1)-th data line DLm−1 and the (n+3)-th gate line GLn+3, and the fourth pixel P4 is electrically connected to the m-th data line DLm and the (n+3)-th gate line GLn+3.

The fifth pixel P5 is electrically connected to the m-th data line DLm and the (n+4)-th gate line GLn+4, and the sixth pixel P6 is electrically connected to the (m+1)-th data line DLm+1 and the (n+5)-th gate line GLn+5. The seventh pixel P7 is electrically connected to the m-th data line DLm and the (n+6)-th gate line GLn+6, and the eighth pixel P8 is electrically connected to the m-th data line DLm and the (n+7)-th gate line GLn+7.

The m-th data line DLm is bent in a zigzag shape to be discontinuously disposed between a first pixel column PC1 and a second pixel column PC2 adjacent each other. The zigzag shape may include a pulse shape. As described in FIGS. 3A and 3B, the first and second light-blocking parts A1 and A2 having widths different from each other are repeatedly formed between the first and second pixel columns PC1 and PC2 in a period, so that the first and second light-blocking parts A1 and A2 may prevent vertical line defects.

Figure 8:
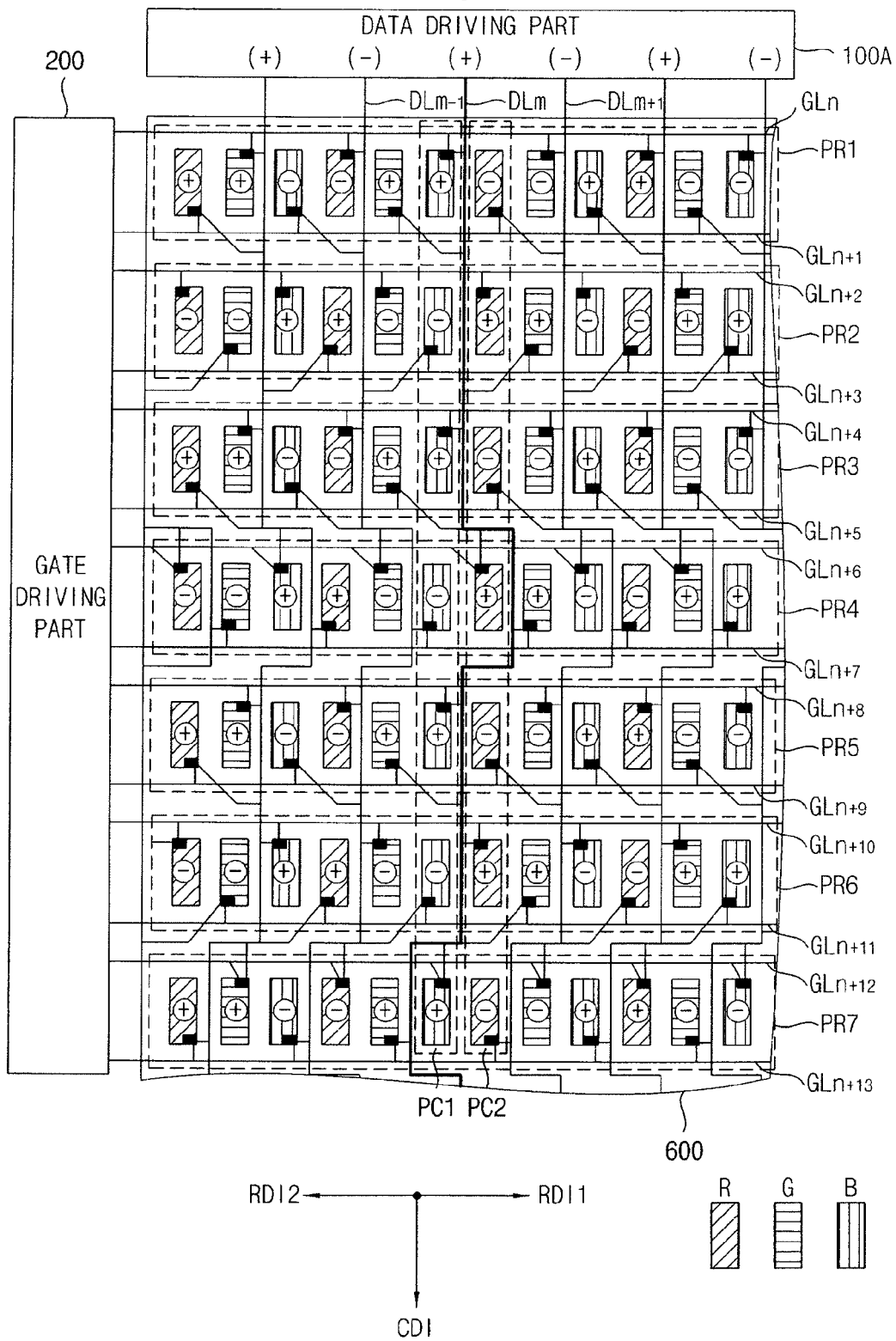
FIG. 8 is a plan view illustrating an LCD device according to an exemplary embodiment of the present invention.
Figure 9:
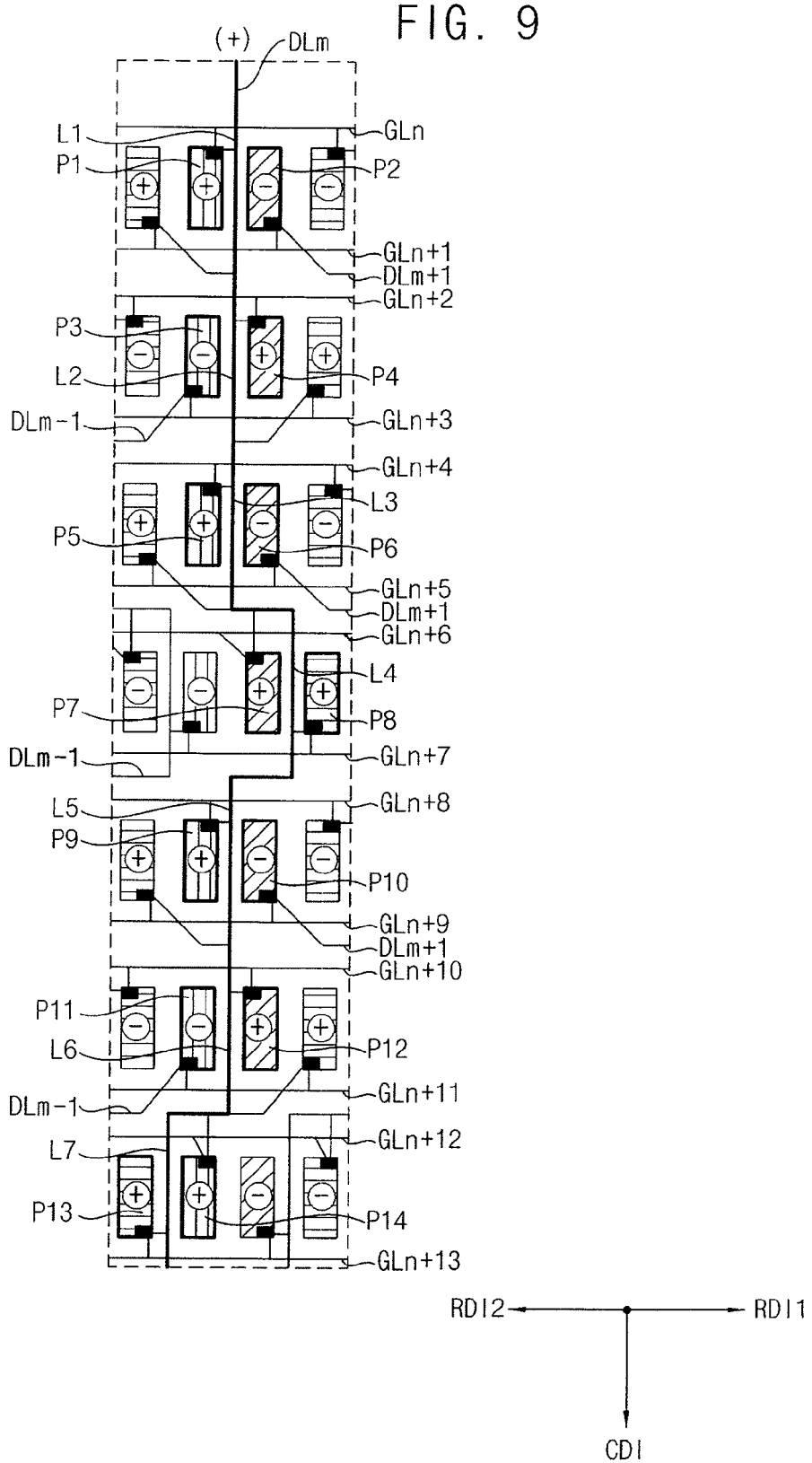
FIG. 9 is an enlarged view showing a pixel structure of the display panel as shown in FIG. 8.

FIG. 8 is a plan view illustrating an LCD device according to an exemplary embodiment of the present invention. FIG. 9 is an enlarged view showing a pixel structure of the display panel as shown in FIG. 8. Referring to FIGS. 8 and 9, the LCD device includes a data driving part 100A, a gate driving part 200 and a display panel 600. The data driving part 100A respectively applies data signals having alternating polarities to a plurality of data lines DLm−1, DLm and DLm+1 formed on the display panel 600 for one frame. The data driving part 100A may drive the display panel 600 in a column inversion driving method.

The gate driving part 200 sequentially applies gate signals to a plurality of gate lines GLn, GLn+1, . . . , GLn+7 formed on the display panel 600, where 'n' is a positive integer. An odd-numbered gate line and an even-numbered gate line apply gate signals to pixels included in one pixel row. The one pixel row includes a red pixel R, a green pixel G, and a blue pixel B. For example, the red pixel R is electrically connected to an odd-numbered gate line, the green pixel G is electrically connected to an even-numbered gate line, and the blue pixel B is electrically connected to the odd-numbered and even-numbered gate lines.

The display panel 600 includes a plurality of pixels, the data lines DLm−1, DLm and DLm+1, and the gate lines GLn, GLn+1, . . . , GLn+13. The pixels are arranged in a plurality pixel rows PR1, PR2, PR3 and PR4 and a plurality of pixel columns PC1 and PC2, and may be driven in a 1×2 dot inversion method.

For example, an m-th data line DLm is extended in the column direction, and a zigzag pattern bent in a zigzag shape is repeatedly formed in a period of seven pixel rows. The zigzag shape may include an increasing step followed by a decreasing step. Thus, the m-th data line DLm is discontinuously disposed between a first pixel column PC1 and a second pixel column PC2 adjacent each other. The m-th data line DLm is disposed between first and second pixel columns PC1 and PC2 in correspondence with a first pixel row PR1, a second pixel row PR2 and a third pixel row PR3, and is not disposed between first and second pixel columns PC1 and PC2 in correspondence with a fourth pixel row PR4. The m-th data line DLm is disposed between first and second pixel columns PC1 and PC2 in correspondence with a fifth pixel row PR5 and sixth pixel row PR6, and is not disposed between first and second pixel columns PC1 and PC2 in correspondence with a seventh pixel row PR7.

The m-th data line DLm includes a first wiring L1, a second wiring L2, a third wiring L3, a fourth wiring L4, a fifth wiring L5, a sixth wiring L6 and a seventh wiring L7. The first wiring L1 is disposed between a first pixel P1 and a second pixel P2, and the second wiring L2 is extended in the column direction CDI with respect to the first wiring L1. The second wiring L2 is disposed between a third pixel P3 and a fourth pixel P4 of a second pixel row PR2 adjacent the first pixel row PR1. The third wiring L3 is extended in the column direction CDI with respect to the second wiring L2 to be disposed between a fifth pixel P5 and a sixth pixel P6 of a third pixel row PR3 adjacent the second row PR2, and the fourth wiring L4 is bent in a first row direction RDI1 with respect to the third wiring L3 to be disposed between a seventh pixel P7 and an eighth pixel P8 of a fourth pixel row PR4 adjacent the third pixel row PR3.

The fifth wiring L5 is bent in a second row direction RDI2 opposite to the first row direction RDI1 with respect to the fourth wiring L4, so that the fifth wiring L5 is disposed between a ninth pixel P9 and a tenth pixel P10 of a fifth pixel row PR5 adjacent the fourth pixel row PR4. The sixth wiring L6 is extended in the column direction CDI with respect to the fifth wiring L5 to be disposed between an eleventh pixel P11 and a twelfth pixel P12 of a sixth pixel row PR6 adjacent the fifth pixel row PR5. The seventh wiring L7 is bent in the second row direction RDI2 with respect to the sixth wiring L6 to be disposed between a thirteenth pixel P13 and a fourteenth pixel P14 of a seventh pixel row PR7 adjacent the sixth pixel row PR6.

The n-th gate line GLn is disposed above the first pixel row PR1, the (n+1)-th gate line GLn+1 is disposed below the first pixel row PR1, and the n-th gate line GLn and the (n+1)-th gate line GLn+1 are electrically connected to pixels of the first pixel row PR1, respectively. The (n+2)-th gate line GLn+2 is disposed above the second pixel row PR2, the (n+3)-th gate line GLn+3 is disposed below the first pixel row PR1, and the (n+2)-th gate line GLn+2 and the (n+3)-th gate line GLn+3 are electrically connected to pixels of the second pixel row PR2, respectively.

According to the similar manner as above, (n+4)-th to (n+13)-th gate lines GLn+4 to GLn+13 are electrically connected to pixels of the third to seventh pixel rows PR3 to PR7.

The first pixel P1 is electrically connected to the m-th data line DLm and the (n+1)-th gate line GLn+1, and the second pixel P2 is electrically connected to the (m+1)-th data line DLm+1 and the (n+1)-th gate line GLn+1. The third pixel P3 is electrically connected to the (m−1)-th data line DLm−1 and the (n+3)-th gate line GLn+3, and the fourth pixel P4 is electrically connected to the m-th data line DLm and the (n+2)-th gate line GLn+2.

The fifth pixel P5 is electrically connected to the m-th data line DLm and the (n+4)-th gate line GLn+4, and the sixth pixel P6 is electrically connected to the (m+1)-th data line DLm+1 and the (n+5)-th gate line GLn+5. The seventh pixel P7 is electrically connected to the m-th data line DLm and the (n+6)-th gate line GLn+6, and the eighth pixel P8 is electrically connected to the m-th data line DLm and the (n+7)-th gate line GLn+7.

The ninth pixel P9 is electrically connected to the m-th data line DLm and the (n+8)-th gate line GLn+8, and the tenth pixel P10 is electrically connected to the (m+1)-th data line DLm+1 and the (n+9)-th gate line GLn+9. The eleventh pixel P11 is electrically connected to the (m−1)-th data line DLm−1 and the (n+11)-th gate line GLn+11, and a twelfth pixel P12 is electrically connected to the m-th data line DLm and the (n+10)-th gate line GLn+10. The thirteenth pixel P13 is electrically connected to the m-th data line DLm and the (n+13)-th gate line GLn+13, and the fourteenth pixel P14 is electrically connected to the m-th data line DLm and the (n+12)-th gate line GLn+12.

The m-th data line DLm is bent in a zigzag shape to be discontinuously disposed between a first pixel column PC1 and a second pixel column PC2 adjacent each other.

As described in FIGS. 3A and 3B, the first and second light-blocking parts A1 and A2 having widths different from each other are repeatedly formed between the first and second pixel columns PC1 and PC2 in a period, so that the first and second light-blocking parts A1 and A2 may prevent vertical line defects.

Figure 10:
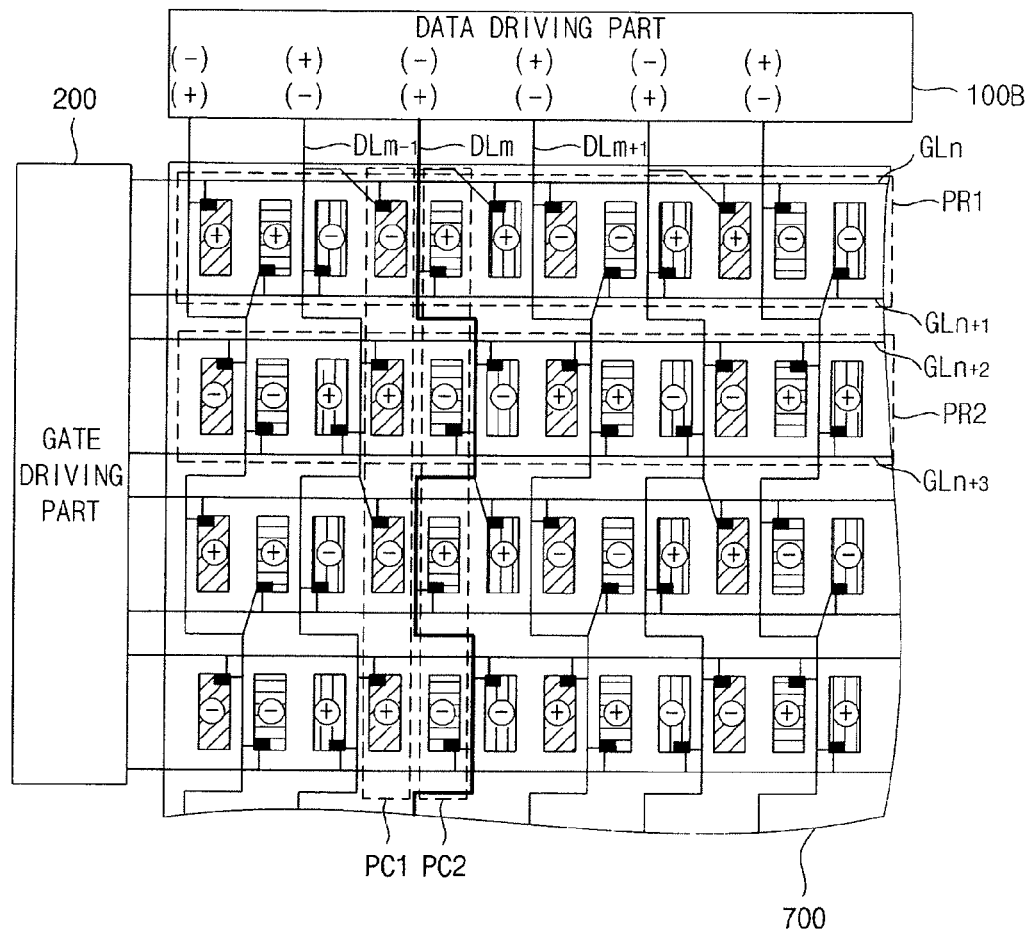
FIG. 10 is a plan view illustrating an LCD device according to an exemplary embodiment of the present invention.
Figure 11:
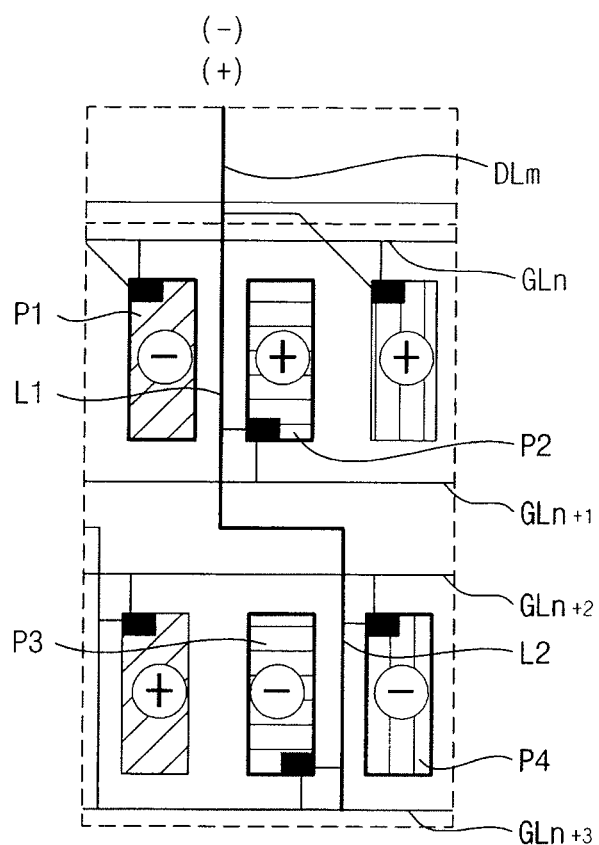
FIG. 11 is an enlarged view showing a pixel structure of the display panel as shown in FIG. 10.
Figure 11:
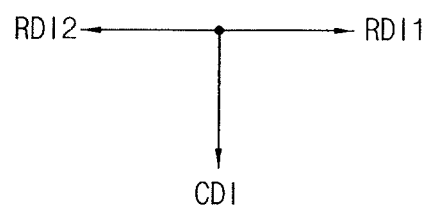

FIG. 10 is a plan view illustrating an LCD device according to an exemplary embodiment of the present invention. FIG. 11 is an enlarged view showing a pixel structure of the display panel as shown in FIG. 10. Referring to FIGS. 10 and 11, the LCD device includes a data driving part 100B, a gate driving part 200 and a display panel 500.

During one frame, the data driving part 100B applies a data signal of positive polarity (+) and a data signal of negative polarity (−) to each of data lines DLm−1, DLm and DLm+1, which are formed on the display panel 700, in two horizontal periods (or 2H). For example, the data driving part 100B may drive the display panel 700 in a dot inversion driving method.

The gate driving part 200 sequentially applies gate signals to a plurality of gate lines GLn, GLn+1, GLn+2 and GLn+3 formed on the display panel 100, where 'n' is a positive integer. An odd-numbered gate line and an even-numbered gate line apply gate signals to pixels included in one pixel row. The one pixel row may include a red pixel R, a green pixel G and a blue pixel B. For example, the red pixel R is electrically connected to an odd-numbered gate line, the green pixel G is electrically connected to an even-numbered gate line, and the blue pixel B is electrically connected to the odd-numbered and even-numbered gate lines.

The display panel 700 includes a plurality of pixels, the data lines DLm−1, DLm and DLm+1, and the gate lines GLn, GLn+1 and GLn+3. The pixels are arranged in a plurality pixel rows PR1 and PR2 and a plurality of pixel columns PC1 and PC2, and may be driven in a 1×2 dot inversion method.

For example, an m-th data line DLm is extended in the column direction, and a zigzag pattern bent in a zigzag shape is repeatedly formed in a period of two pixel rows. The zigzag shape may include two pulse shapes. Thus, the m-th data line DLm is discontinuously disposed between the first pixel column PC1 and a second pixel column PC2 adjacent each other. The m-th data line DLm is disposed between the first and second pixel columns PC1 and PC2 in correspondence with a first pixel row PR1. The m-th data line DLm is not disposed between the first and second pixel columns PC1 and PC2 in correspondence with a second pixel row PR2.

The m-th data line DLm includes a first wiring L1 and a second wiring L2. The first wiring L1 is disposed between a first pixel P1 and a second pixel P2 of the first pixel row PR1, and the second wiring L2 is bent in a first row direction RDI1 with respect to the first wiring L1 to be disposed between a third pixel P3 and a fourth pixel P4 of a second pixel row PR2 adjacent the first pixel row PR1.

The n-th gate line GLn is disposed above the first pixel row PR1, and the (n+1)-th gate line GLn+1 is disposed below the first pixel row PR1. The n-th and (n+1)-th gate lines GLn and GLn+1 are electrically connected to pixels of the first pixel row PR1.

The first pixel P1 is electrically connected to the (m−1)-th data line DLm−1 and the n-th gate line GLn, and the second pixel P2 is electrically connected to the m-th data line DLm and the (n+1)-th gate line GLn+1.

The third pixel P3 is included in the second pixel column PC2, and is electrically connected to the m-th data line DLm and the (n+3)-th gate line GLn+3. The fourth pixel P4 is electrically connected to the m-th data line DLm and the (n+2)-th gate line GLn+2.

The m-th data line DLm is bent in a zigzag shape to be discontinuously disposed between a first pixel column PC1 and a second pixel column PC2 adjacent each other. As described in FIGS. 3A and 3B, the first and second light-blocking parts A1 and A2 having widths different from each other are repeatedly formed between the first and second pixel columns PC1 and PC2 in a period, so that the first and second light-blocking parts A1 and A2 may prevent vertical line defects.

The data driving part 100B may be driven in a dot inversion method (i.e., +, −), so that the display panel 700 is driven in a 1×2 dot inversion method. Alternatively, the data driving part 100B may be driven in one plus two dot inversion method (i.e., +, −) or two dot plus one inversion method (i.e., +, +, −), so that the display panel 700 may be driven in a 1×2 dot inversion method.

Figure 12:
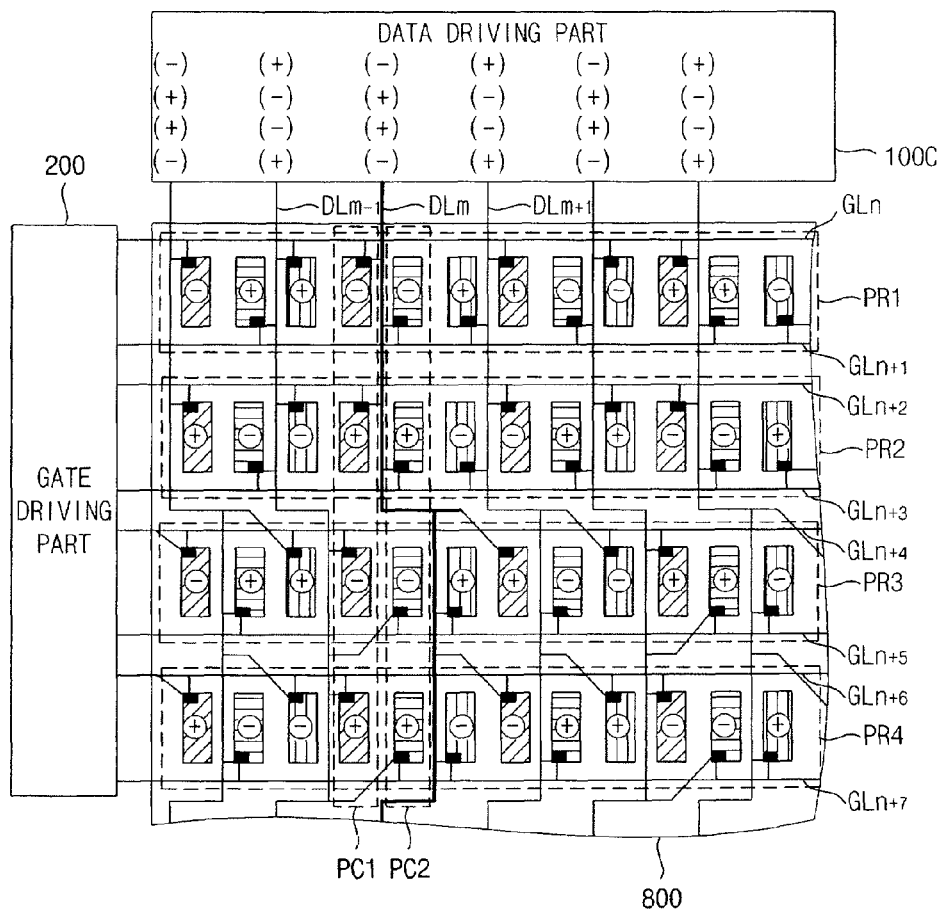
FIG. 12 is a plan view illustrating an LCD device according to an exemplary embodiment of the present invention.
Figure 12:
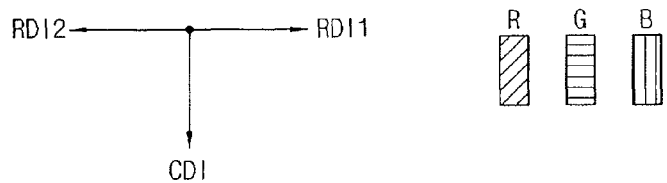
Figure 13:
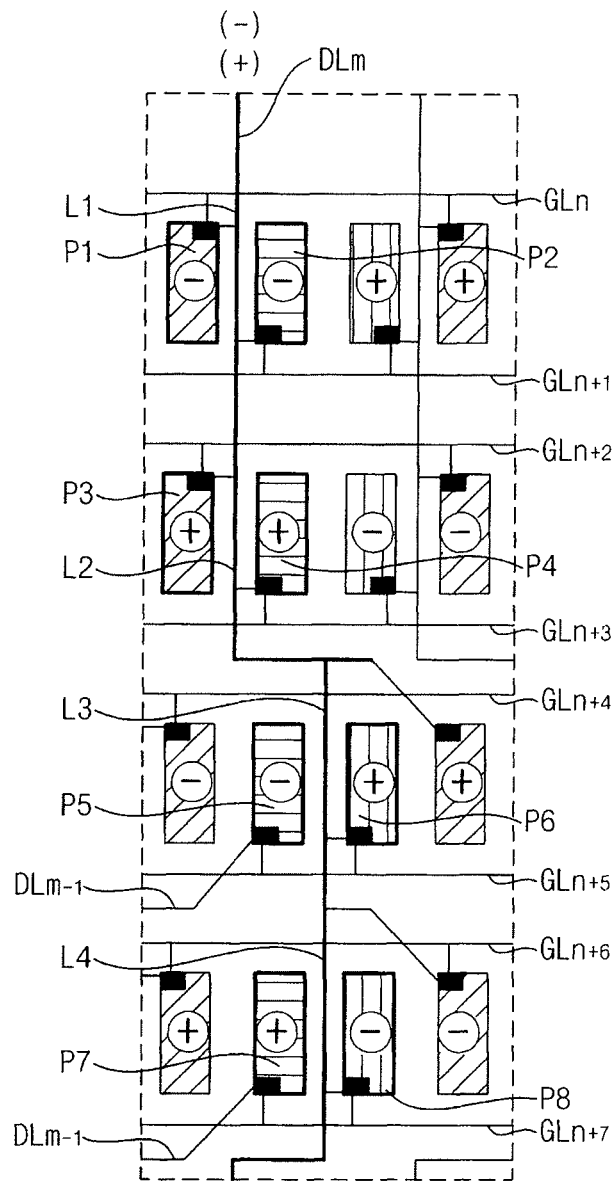
FIG. 13 is an enlarged view showing a pixel structure of the display panel as shown in FIG. 12.
Figure 13:
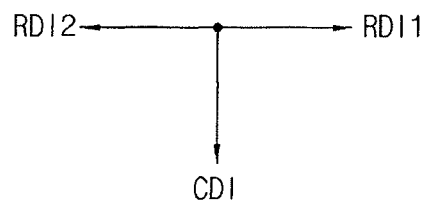

FIG. 12 is a plan view illustrating an LCD device according to an exemplary embodiment of the present invention. FIG. 13 is an enlarged view showing a pixel structure of the display panel as shown in FIG. 12. Referring to FIGS. 12 and 13, the LCD device includes a data driving part 100C, a gate driving part 200 and a display panel 800.

During one frame, the data driving part 100C applies a data signal of negative polarity (−), a data signal of positive polarity (+), a data signal of positive polarity (+) and a data signal of negative polarity (−) to each of data lines DLm−1, DLm and DLm+1 in synchronizing with a horizontal synchronization signal (Hsync), which are formed on the display panel 700, in four horizontal periods (or 4H). For example, the data driving part 100C may drive the display panel 700 in a dot inversion driving method.

For example, the data driving part 100C repeatedly and sequentially applies data signals of negative polarity (−), positive polarity (+), positive polarity (+) and negative polarity (−) to the m-th data line DLm, and repeatedly and sequentially applies data signals of positive polarity (+), negative polarity (−), negative polarity (−) and positive polarity (+) to the (m−1)-th and (m+1)-th data line DLm−1 and DLm+1.

The gate driving part 200 sequentially applies gate signals to a plurality of gate lines GLn, GLn+1, . . . , GLn+7 formed on the display panel 100 where 'n' is a positive integer. An odd-numbered gate line and an even-numbered gate line apply gate signals to pixels included in one pixel row. The one pixel row may include a red pixel R, a green pixel G, and a blue pixel B. For example, the red pixel R is electrically connected to an odd-numbered gate line, the green pixel G is electrically connected to an even-numbered gate line, and the blue pixel B is electrically connected to the odd-numbered and even-numbered gate lines.

The display panel 800 includes a plurality of pixels, the data lines DLm−1, DLm and DLm+1, and the gate lines GLn, GLn+1, . . . , GLn+7. The pixels are arranged in a plurality pixel rows PR1 and PR2 and a plurality of pixel columns PC1 and PC2, and may be driven in a 1×2 dot inversion method.

For example, an m-th data line DLm is extended in the column direction, and a zigzag pattern bent in a zigzag shape is repeatedly formed in a period of four pixel rows. The zigzag shape may include a pulse shape. Thus, the m-th data line DLm is discontinuously disposed between the first pixel column PC1 and a second pixel column PC2 adjacent each other. The m-th data line DLm is disposed between the first and second pixel columns PC1 and PC2 in correspondence with a first pixel row PR1 and a second pixel row PR2. The m-th data line DLm is not disposed between the first and second pixel columns PC1 and PC2 in correspondence with a third pixel row PR3 and a fourth pixel row PR4.

The m-th data line DLm includes a first wiring L1, a second wiring L2, a third wiring L3 and a fourth wiring L4. The first wiring L1 is disposed between a first pixel P1 and a second pixel P2 of the first pixel row PR1, and the second wiring L2 is extended in the column direction CDI with respect to the first wiring L1 to be disposed between a third pixel P3 and a fourth pixel P4 of a second pixel row PR2 adjacent the first pixel row PR1. The third wiring L3 is bent in the row direction with respect to the second wiring L2 to be disposed between a fifth pixel P5 and a sixth pixel P6 of a third pixel row PR3 adjacent the second pixel row PR2, and the fourth wiring L4 is extended in the column direction CDI with respect to the third wiring L3 to be disposed between a seventh pixel P7 and an eighth pixel P8 of a fourth pixel row PR4 adjacent the third pixel row PR3.

The n-th gate line GLn is disposed above the first pixel row PR1, the (n+1)-th gate line GLn+1 is disposed below the first pixel row PR1, and the n-th gate line GLn and the (n+1)-th gate line GLn+1 are electrically connected to pixels of the first pixel row PR1, respectively.

According to a similar manner as above, (n+2)-th to (n+7)-th gate lines GLn+2 to GLn+7 are electrically connected to pixels of the second to fourth pixel rows PR2 to PR4.

The first pixel P1 is electrically connected to the m-th data line DLm and the (n)-th gate line GLn, and the second pixel P2 is electrically connected to the m-th data line DLm and the (n+1)-th gate line GLn+1. The third pixel P3 is electrically connected to the m-th data line DLm and the (n+2)-th gate line GLn+2, and the fourth pixel P4 is electrically connected to the m-th data line DLm and the (n+3)-th gate line GLn+3.

The fifth pixel P5 is electrically connected to the (m−1)-th data line DLm−1 and the (n+5)-th gate line GLn+5, and the sixth pixel P6 is electrically connected to the m-th data line DLm and the (n+5)-th gate line GLn+5. The seventh pixel P7 is electrically connected to the (m−1)-th data line DLm−1 and the (n+7)-th gate line GLn+7, and the eighth pixel P8 is electrically connected to the m-th data line DLm and the (n+7)-th gate line GLn+7.

The m-th data line DLm is bent in a zigzag shape to be discontinuously disposed between a first pixel column PC1 and a second pixel column PC2 adjacent each other. As described in FIGS. 3A and 3B, the first and second light-blocking parts A1 and A2 having widths different from each other are repeatedly foamed between the first and second pixel columns PC1 and PC2 in a period, so that the first and second light-blocking parts A1 and A2 may prevent vertical line defects.

As described above, in at least one embodiment of the present invention, a data line is bent in a zigzag shape to be discontinuously disposed between pixel columns adjacent each other. Accordingly, first and second light-blocking parts having widths different from each other are repeatedly formed between adjacent pixel columns in a period, so that the first and second light-blocking parts may prevent vertical line defects.

Having described exemplary embodiments of the present invention, those skilled in the art will readily appreciate that many modifications can be made in the exemplary embodiments without departing from the present invention. Accordingly, all such modifications are intended to be included within the scope of the disclosure.

What is claimed is:

1. A liquid crystal display ("LCD") device comprising:
a display panel comprising:
a plurality of pixels arranged in a column direction and a row direction;
a plurality of data lines, wherein at least one of the data lines extends in a zigzag shape along the column direction to be discontinuously disposed between two adjacent columns of the pixels, and wherein a first data line of the at least one data line is electrically connected to two of the pixels that are adjacent in the row direction in a first pixel row;
a storage line disposed between a first pixel column and a second pixel column in the first pixel row;
a second storage line disposed between the first pixel column and the second pixel column in a second pixel row, wherein the second storage line is thinner than the first storage line, and the first data line is disposed on the first storage line in the first pixel row;
a first light-blocking part disposed on an area between the first pixel column and the second pixel column in the first pixel row;
a second light-blocking part thinner than the first light-blocking part and disposed on an area between the first pixel column and the second pixel column in the second pixel row; and
a data driving part configured to apply a data signal to the plurality of data lines,
wherein a first pixel and second pixel of the pixels are located in the first pixel column and in the first pixel row, respectively,
a third pixel, a fourth pixel, and another pixel of the pixels adjacent in the row direction in the second pixel row are located in the second pixel column, a third pixel column, and a fourth pixel column, respectively, and
the third pixel is connected to a second data line other than the first data line and the fourth pixel is connected to the first data line, and
the first pixel, the second pixel, the fourth pixel, and the another pixel are electrically connected to the first data line.

2. The LCD device of claim 1, wherein the first light-blocking part is disposed on an area on which one of the data lines is continued, and the second light-blocking part is disposed on an area on which the one of the data lines is discontinued, and the first storage line is disposed under the one of the data lines that is continued, and the second storage line is disposed under the one of the data lines that is discontinued.

3. The LCD device of claim 1, wherein the pixels of the display panel are driven in a 1 ×2 dot inversion method.

4. The LCD device of claim 1, wherein at least one row of the pixels arranged in the row direction comprises a red pixel, a green pixel and a blue pixel.

5. The LCD device of claim 4, wherein the display panel further comprises:

a plurality of gate lines including odd numbered gate lines and even numbered gate lines extending in the row direction, wherein at least one of the odd numbered gates lines is electrically connected to the red pixel and the blue pixel, and wherein at least one of the even numbered gate lines is electrically connected to the green pixel and the blue pixel.

6. The LCD device of claim 1, wherein the plurality of data lines include odd numbered data lines and even numbered data lines and the data diving part is configured to apply a data signal having a first polarity to the odd numbered data lines, and apply a data signal having a second alternate polarity to the even numbered data lines during one frame.

7. The LCD device of claim 6, wherein one of the odd numbered data lines comprises:
   a first wiring disposed between the first pixel and the second pixel in the first pixel row; and
   a second wiring bent in a row direction with respect to the first wiring to be disposed between the third pixel and the fourth pixel of the second pixel row adjacent the first pixel row.

8. The LCD device of claim 7, wherein the first pixel, the second pixel, and the fourth pixel are electrically connected to the one odd numbered data line and the third pixel is electrically connected to an adjacent one of the even numbered data lines.

9. The LCD device of claim 6, wherein one of the odd numbered data lines comprises:
   a first wiring disposed between the first pixel and the second pixel in the first pixel row;
   a second wiring bent in a first row direction with respect to the first wiring to be disposed between the third pixel and the fourth pixel in the second pixel row adjacent the first pixel row;
   a third wiring bent in the first row direction with respect to the second wiring to be disposed between a fifth pixel and a sixth pixel in a third pixel row of the pixels adjacent the second pixel row; and
   a fourth wiring bent in a second row direction substantially opposite to the first row direction with respect to the third wiring to be disposed between a seventh pixel and an eighth pixel in a fourth pixel row of the pixels adjacent the third pixel row.

10. The LCD device of claim 9, wherein the first pixel, the third pixel, the fourth pixel, the sixth pixel, the seventh pixel, and the eighth pixel are electrically connected to the one odd numbered data line, the second pixel is electrically connected to one of the even numbered data lines subsequently adjacent the one odd numbered data line, and the fifth pixel is electrically connected to a one of the even numbered data lines adjacently preceding the one odd numbered data line.

11. The LCD device of claim 6, wherein one of the odd numbered data lines comprises:
   a first wiring disposed between the first pixel and the second pixel in the first pixel row;
   a second wiring extended in a column direction with respect to the first wiring to be disposed between the third pixel and the fourth pixel in the second pixel row adjacent the first pixel row;
   a third wiring extended in the column direction with respect to the second wiring to be disposed between a fifth pixel and a sixth pixel in a third pixel row of the pixels adjacent the second pixel row; and
   a fourth wiring bent in the row direction with respect to the third wiring to be disposed between a seventh pixel and an eighth pixel in a fourth pixel row of the pixels adjacent the third pixel row.

12. The LCD device of claim 11, wherein the first pixel, the fourth pixel, the fifth pixel, the seventh pixel, and the eighth pixel are electrically connected to the one odd numbered data line, the second pixel and the sixth pixel are electrically connected to one of the even numbered data lines subsequently adjacent the one odd numbered data line, and the third pixel is electrically connected to one of the even numbered data lines adjacently preceding the one odd numbered data line.

13. The LCD device of claim 6, wherein one of the odd numbered data lines comprises:
   a first wiring disposed between the first pixel and the second pixel in the first pixel row;
   a second wiring extended in a column direction with respect to the first wiring to be disposed between the third pixel and the fourth pixel in the second pixel row adjacent the first pixel row;
   a third wiring extended in the column direction with respect to the second wiring to be disposed between a fifth pixel and a sixth pixel in a third pixel row of the pixels adjacent the second pixel row;
   a fourth wiring bent in a first row direction with respect to the third wiring to be disposed between a seventh pixel and an eighth pixel in a fourth pixel row of the pixels adjacent the third pixel row;
   a fifth wiring bent in a second row direction substantially opposite to the first row direction with respect to the fourth wiring to be disposed between a ninth pixel and a tenth pixel in a fifth pixel row of the pixels adjacent the fourth pixel row;
   a sixth wiring extended in the column direction with respect to the fifth wiring to be disposed between an eleventh pixel and a twelfth pixel in a sixth pixel row of the pixels adjacent the fifth pixel row; and
   a seventh wiring bent in the second row direction with respect to the sixth wiring to be disposed between a thirteenth pixel and a fourteenth pixel in a seventh pixel row of the pixels adjacent the sixth pixel row.

14. The LCD device of claim 13, wherein the first pixel, the fourth pixel, the fifth pixel, the seventh pixel, the eighth pixel, the ninth pixel, the twelfth pixel, the thirteenth pixel, and the fourteen pixel are electrically connected to the one odd numbered data line, the second pixel, the sixth pixel, and the tenth pixel are electrically connected to one of the even numbered data lines subsequently adjacent the one odd numbered data line, and the third pixel and the eleventh pixel are electrically connected to one of the even numbered data lines adjacently preceding the one odd numbered data line.

15. The LCD device of claim 1, wherein the data driving part alternately applies a data signal of a first polarity and a data signal of a second and different polarity to the odd numbered data lines, and alternately applies a data signal of the second polarity and a data signal of the first polarity to the even numbered data lines, during one frame.

16. The LCD device of claim 15, wherein one of the odd numbered data lines comprises:
   a first wiring disposed between the first pixel and the second pixel of the first pixel row; and
   a second wiring bent in a row direction with respect to the first wiring to be disposed between the third pixel and the fourth pixel of a second pixel row adjacent the first pixel row.

17. The LCD device of claim 16, wherein the first pixel is electrically connected to one of the even numbered data lines adjacently preceding the one odd numbered data line, and the second pixel, the third pixel, and the fourth pixel are electrically connected to the one odd numbered data line.

18. The LCD device of claim 1, wherein the data driving part alternately applies data signals of a first polarity, a second and different polarity, the second polarity and the first polarity to the odd numbered data lines, and alternately applies data signals of the second polarity, the first polarity, the first polarity and the second polarity to the even numbered data lines, during one frame.

19. The LCD device of claim 18, wherein one of the odd numbered data lines comprises:
 a first wiring disposed between the first pixel and the second pixel in the first pixel row;
 a second wiring extended in the column direction with respect to the first wiring to be disposed between the third pixel and the fourth pixel in the second pixel row adjacent the first pixel row;
 a third wiring bent in the row direction with respect to the second wiring to be disposed between a fifth pixel and a sixth pixel in a third pixel row of the pixels adjacent the second pixel row; and
 a fourth wiring extended in the column direction with respect to the third wiring to be disposed between a seventh pixel and an eighth pixel in a fourth pixel row of the pixels adjacent the third pixel row.

20. The LCD device of claim 19, wherein the first pixel, the second pixel, the third pixel, the fourth pixel, the sixth pixel, and the eighth pixel are electrically connected to the one odd numbered data line, and the fifth pixel and seventh pixel are electrically connected to one of the even numbered data lines adjacently preceding the one odd numbered data line.

21. The LCD device of claim 1, further comprising a liquid crystal layer disposed between the first storage line and the first light-blocking part, and disposed between the second storage line and the second light-blocking part.

22. The LCD device of claim 1, wherein the first storage line is disposed on a first substrate of the display panel, the second storage line is disposed on the first substrate, the first light-blocking part is disposed on a second substrate of the display panel, the second light-blocking part is disposed on the second substrate, the first substrate faces the second substrate, the first storage line faces the first light-blocking part, the second storage line faces the second light-blocking part, the first storage line is spaced apart from the second storage line and the first light-blocking part is spaced apart from the second light-blocking part.

* * * * *